A. E. MOOK.
BIRD-CAGE.
No. 189,251. Patented April 3, 1877.
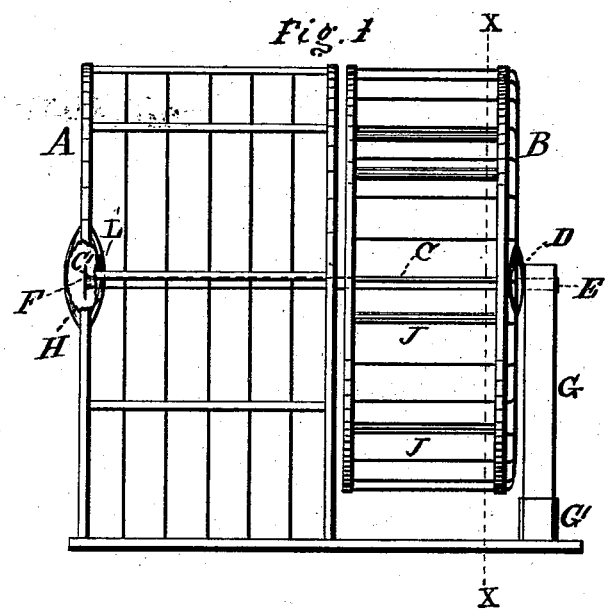
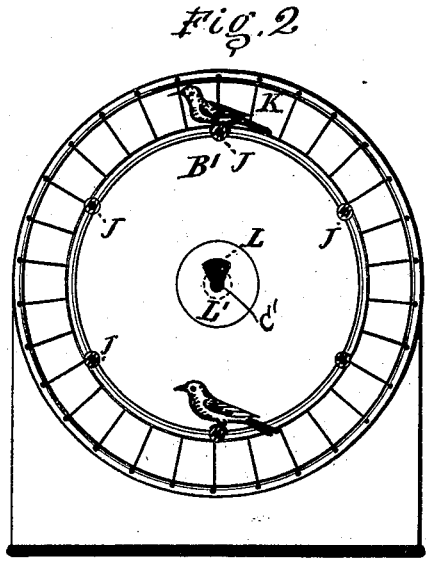
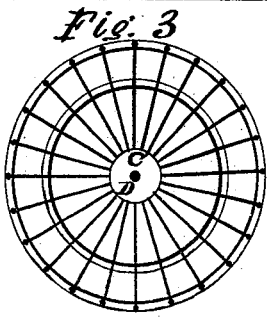
Witnesses,
Amos W. Sangster,
H. P. S. Ray
Inventor,
Anson E. Mook,
By James Sangster
Atty

UNITED STATES PATENT OFFICE.

ANSON E. MOOK, OF EAST PEMBROKE, NEW YORK.

IMPROVEMENT IN BIRD-CAGES.

Specification forming part of Letters Patent No. 189,251, dated April 3, 1877; application filed December 26, 1876.

*To all whom it may concern:*

Be it known that I, ANSON E. MOOK, of the town of East Pembroke, in the county of Genesee and State of New York, have invented certain new and useful Improvements in Bird-Cages, which improvements are fully set forth in the following specification, reference being had to the accompanying drawings.

My invention consists in the combination of the cage with a removable rotative wheel, arranged so as to be easily taken out to clean, and provided with a large annular opening around the supporting-rod, so that the bird may pass from the cage to the wheel without injury while the latter is in motion.

My invention further consists in combining with the rotative wheel a series of perches, arranged to turn easily upon an axis, for purposes which will be more clearly hereinafter shown by reference to the said drawings, in which—

Figure 1 is a side elevation; Fig. 2, a front view, showing a section through the wheel through line X X, Fig. 1; and Fig. 3 represents a front view of the wheel.

A represents the body of the cage, which may be made in any of the well-known forms, and of the usual materials. B is the wheel. B' represents an opening in the center of the inner side of the same. C is a rod for supporting said wheel. It is rigidly fastened thereto at D, and forms a part of the same, so that it moves with it when turning. It is supported on bearings at E and F, the ends of the rod C projecting far enough on each side of the wheel so that one end will pass into the standard G, and the other end, which has a flat head, C', as shown in Fig. 1, through an opening represented as broken out at H in said Fig. 1, into opening L, Fig. 2. The standard G is fitted into the socket G', so that it can be easily taken out.

I represents the wires on the periphery of the wheel, which are put on in the usual way. J J are the perches, which are made to turn on pivots, as shown. They are arranged far enough from the periphery of the wheel or wires I to leave room enough for the bird to pass through, as shown at K, Fig. 2.

The wheel is taken out to be cleaned by lifting the standard G out of the socket G', and raising the end and head C' so that it will come out of the opening L, (shown in Fig. 2,) the dotted lines L' showing the position of the head C' when in place.

The operation of the invention is simple and easily understood.

I claim as my invention—

1. The wheel B, provided with the rod D, having head C', in combination with the opening L and standard G, constructed and arranged substantially as and for the purposes specified.

2. The combination of a revolving cage-wheel, B, with a series of perches, J, for the purposes described.

ANSON E. MOOK.

Witnesses:
 AMOS W. SANGSTER,
 THOS. S. RAY.